US010032173B2

(12) United States Patent
Ming

(10) Patent No.: US 10,032,173 B2
(45) Date of Patent: Jul. 24, 2018

(54) ELECTRONIC ANTI-COUNTERFEITING SYSTEM AND ELECTRONIC ANTI-COUNTERFEITING METHOD THEREOF

(71) Applicant: Lui Kam Ming, Hong Kong (CN)

(72) Inventor: Lui Kam Ming, Hong Kong (CN)

( * ) Notice: Subject to any disclaimer, the term of this patent is extended or adjusted under 35 U.S.C. 154(b) by 0 days.

(21) Appl. No.: 15/207,783

(22) Filed: Jul. 12, 2016

(65) Prior Publication Data

US 2017/0017967 A1 Jan. 19, 2017

(30) Foreign Application Priority Data

Jul. 17, 2015 (CN) .......................... 2015 1 0423419

(51) Int. Cl.
*G06K 1/00* (2006.01)
*G06Q 30/00* (2012.01)
*G06K 17/00* (2006.01)

(52) U.S. Cl.
CPC ........... *G06Q 30/0185* (2013.01); *G06K 1/00* (2013.01); *G06K 2017/0064* (2013.01)

(58) Field of Classification Search
None
See application file for complete search history.

(56) References Cited

U.S. PATENT DOCUMENTS

| 6,226,619 | B1 * | 5/2001 | Halperin | ................ B65D 23/14 705/23 |
| 8,300,806 | B2 * | 10/2012 | Grant | ..................... G06Q 30/06 380/28 |
| 9,047,499 | B2 * | 6/2015 | Nordin | ..................... G06K 5/00 |
| 2009/0219132 | A1 * | 9/2009 | Maytal | ................. G06Q 30/018 340/5.8 |
| 2010/0164689 | A1 * | 7/2010 | Napolitano | ........ G06K 17/0022 340/10.1 |
| 2013/0020390 | A1 * | 1/2013 | Chen | ..................... G06Q 10/08 235/385 |
| 2014/0239074 | A1 * | 8/2014 | Wang | ............... G06K 19/07749 235/488 |

(Continued)

*Primary Examiner* — Christle I Marshall
(74) *Attorney, Agent, or Firm* — Weiss & Moy, P.C.; Jeffrey D. Moy

(57) ABSTRACT

The present invention, which is applicable to the field of electronic anti-counterfeiting technology, provides an electronic anti-counterfeiting system and an electronic anti-counterfeiting method using the same. The electronic anti-counterfeiting system comprises: a server disposed in a data center, the server comprising a database which stores the information about the logistics code and the anti-counterfeiting code of goods and the goods' production, transportation, sales and authenticity information corresponding to the information about the logistics code and the anti-counterfeiting code; at least one sales terminal in communication with the server, the sales terminal, after reading the logistics code of the goods, sending to the server such information that the goods is sold; and at least one query terminal in communication with the server, the query terminal, after reading the anti-counterfeiting code of the goods, sending the anti-counterfeiting code to the server to gain access to query result information returned from the server. In this way, the present invention improves the reliability of electronic anti-counterfeiting of goods.

24 Claims, 4 Drawing Sheets

(56) References Cited

U.S. PATENT DOCUMENTS

| | | | |
|---|---|---|---|
| 2015/0076235 A1* | 3/2015 | Qian | G06K 19/0672 235/492 |
| 2016/0027021 A1* | 1/2016 | Kerdemelidis | G06Q 30/018 705/317 |
| 2016/0314475 A1* | 10/2016 | Nudel | G06F 17/30879 |

* cited by examiner

ELECTRONIC ANTI-COUNTERFEITING SYSTEM AND ELECTRONIC ANTI-COUNTERFEITING METHOD THEREOF

TECHNICAL FIELD

The present invention relates to the field of anti-counterfeiting technology, and particularly to an electronic tagging system.

BACKGROUND ART

Increase in consumerism in the past decades has seen a corresponding increase in product counterfeiting activities. To certify that certain products are genuine, it has been proposed to affix each product with a physical tag before the products leave factory. These tags are not removable except by using special de-tagging devices. Furthermore, each tag is uniquely identifiable. Since such tags cannot be counterfeited or removed from the products easily, products affixed with such tags may be presumed authentic. These tags may be laser tags or anti-counterfeiting rings and each contain an authentication code which provides unique identity.

A tag is identifiable by electronically reading or scanning an authentication code contained within it and sending the code via an automatic telephone voice system or the Internet to a server for authentication. If the server recognizes the authentication code the server will affirm the authenticity of the tag. In this way, the product to which a tag is affixed is presumed genuine.

Such tags have been applied even onto live produce such as the popular hairy crabs in Chinese communities.

In order to prevent theft of the authentication code contained within the tags, each tag is designed such that it will be irreparably broken if an attempt is made to open the tag. A broken tag will indicate that someone has attempted to change or tamper with the tag, causing the consumer to be suspicious of the authenticity of the product affixed with the broken tag.

To further improve security, every attempt to check the authenticity of a tag is recorded in the server. If there are counterfeit copies of a piece of authentication code, there will be a record of more attempts at authenticating the same tag at the server than has been actually made by the owner(s) of the product. In other words, if there were an unexpectedly greater number of attempts at authenticating the same tag, it would imply that the tag is not unique and there is a counterfeit of the tag somewhere. This would alert the owner that the product affixed with a tag containing the same authentication code may be counterfeit. However, in the event that there is a counterfeit tag, the first person to make an enquiry to authenticate the tag will have no idea that the counterfeit tag exists. Only the person who is making at least the second attempt to authenticate the tag may be able to detect that an earlier authentication attempt has been made which he has not made, betraying the existence of the counterfeit tag.

CN201210288489.8, entitled "Multifunctional Product Anti-counterfeiting Identifying System and Anti-counterfeiting Identifying Method Thereof", described a version of this prior art which uses a single tracking tag which actually comprises both a printed barcode and an electronic tag. Information about the product to which the tag is affixed is stored in the server, along with a record of all query attempts in verifying the tag. The shortcoming of this method is that a single tracking tag is used for obtaining information on the product and on the movements of the product. However, there is no privacy relating to the information in the tag. This allows a counterfeit tag to be made and released to the market even before the original tag is released.

CN201310546388.0, entitled "Anti-counterfeiting Tag System", discloses a method which uses two product tracking codes at once, such that authentication of a tag can be carried out even when one of the tracking codes cannot be used.

US2014/0095398 entitled "Double ID Anti-counterfeiting Method and System", discloses using two kinds of anti-counterfeiting codes for preventing counterfeiting of a tag. A first anti-counterfeiting code is a retailer's code and a second anti-counterfeiting code is a product code. Both codes must be provided to an authentication server in order that the server may authenticate the tag. The disadvantage with this method is that the retailer must have already been determined before the product leaves the factory, which limits freedom of choice of retailer severely.

None of these methods is able to effectively prevent theft of the authentication code in a tag. Furthermore, none of these methods effectively addresses the confusion which may arise when a tag is checked many times at the server for authenticity. Therefore, it is desirable to provide an improved method and an accompanying system or device to provide a possibility of mitigating these problems.

DISCLOSURE OF THE INVENTION

In view of the aforementioned deficiencies, it is an object of the present invention to provide an electronic anti-counterfeiting system and an electronic anti-counterfeiting method using the same, in order to improve the reliability of electronic anti-counterfeiting of goods.

In a first aspect, the invention proposes an electronic anti-counterfeiting tagging system for tagging onto product, comprising a unique logistics code which is set in a logistics code device, a unique anti-counterfeiting code which is set in an anti-counterfeiting code device, the logistics code device being provided on the product in a manner which is accessible physically to a handler, the anti-counterfeiting code device being provided on the product in a manner which is not accessible physically to a handler, wherein the unique anti-counterfeiting code is usable for authenticating the product, and the logistics code is useable for recording the distribution process of the product.

Advantageously, the invention allows the separation of important information. One part of the separated information is logistic information which remains accessible immediately on the packaging of the product. The other part of the separated information relates to authentication code which confirms that the product is unique. This authentication code is stored in the anti-counterfeiting code device which is kept onto the product or within the product packaging. Therefore, to access the product to tamper with the product or the authentication code will require a counterfeiter to damage the product packaging before he can reach the anti-counterfeiting code device. This helps the consumer to identify product packaging that has been opened and the genuine product possibly swapped with a counterfeit.

Preferably, the logistics code device is disposed on the packaging of the product, and the anti-counterfeiting code device is disposed within the packaging of the product and/or on the product.

This provides the advantage that the logistics code may help a retailer track the product but it does not matter than the logistics code device is provided on the packaging of the product and is exposed to tampering or counterfeiting, since the anti-counterfeiting code device is protected from access by being disposed within the packaging of the product and/or on the product.

Preferably, the anti-counterfeiting code device is a disposable one which is damaged immediately on being removed from its attachment to the product or the product packing. For example, the anti-counterfeiting code device may comprise a fragile covering which covers over the anti-counterfeiting code, and the covering is broken as soon as an attempt is made to open or move it.

In a second aspect, the invention proposes an electronic anti-counterfeiting system for checking authenticity of goods, characterized in that the goods has a unique logistics code which is set in one or more logistics code devices, and an anti-counterfeiting code which is set in an anti-counterfeiting code device; the electronic anti-counterfeiting system comprising: a server disposed in a data center; the server comprising a database which stores the information about the logistics code and the anti-counterfeiting code of goods; the goods' production, transportation, sales and authenticity information corresponding to information about the logistics code and the anti-counterfeiting code; at least one sales terminal in communication with the server, the sales terminal, on reading the logistics code of the goods, sending to the server such information that the goods is sold; and at least one query terminal in communication with the server, the query terminal, after reading the anti-counterfeiting code of the goods, sending the anti-counterfeiting code to the server to gain access to query result information returned from the server.

Preferably, the logistics code device is disposed on the packaging of the goods, and the anti-counterfeiting code device is disposed within the packaging of the goods and/or on the goods.

Preferably, the logistics code device comprises a printed text, barcode and/or QR code as the logistics code. Alternatively, the logistics code device comprises a radio frequency identification (RFID) tag, which stores the logistics code. Alternatively, the logistics code device comprises a Bluetooth transmitting device which stores the logistics code. Typically, the logistics code is stored in one or more of the logistics code devices.

Preferably, the anti-counterfeiting code device comprises: a printed text, barcode and/or QR code as the anti-counterfeiting code. Alternatively, the anti-counterfeiting code device comprises a RFID tag, which stores the anti-counterfeiting code. Alternatively, the anti-counterfeiting code device comprises a Bluetooth transmitting device, which stores the anti-counterfeiting code. Preferably, the anti-counterfeiting code device is removably disposed on the product or the packaging of the goods, and the anti-counterfeiting code device is damaged when it is removed, and the anti-counterfeiting code is confidential before the process of the sale of the goods is completed.

Preferably, the anti-counterfeiting code is a printed text, barcode and/or QR code, and it is printed on the anti-counterfeiting code device.

Preferably, anti-counterfeiting code device comprises a covering which covers over the anti-counterfeiting code, and the covering will be damaged or broken is an attempt is made to remove or open it.

Preferably, the anti-counterfeiting code device is a low-frequency (LF) read-only RFID tag, the anti-counterfeiting code device comprises an openable radio frequency (RF) shielding device, the LF read-only RFID tag is disposed within the RF shielding device, and, when the RFID tag is disposed within a RE shield packaging, the signal emitted by the RFID tag is shielded by the RF shield packaging, and the RF shield packaging is damaged immediately it is opened, and it cannot be repackaged.

Optionally, the RFID tag has a frequency of use of 120 to 150 kHz.

In some preferred embodiments, the anti-counterfeiting code device is a high-frequency (I-IF) or ultra-high-frequency (UHF) read-write RFID tag, and the anti-counterfeiting code is stored in the HF or UHF read-write RFID tag, and the HF or UHF read-write RFID tag is activated and issues the anti-counterfeiting code after a default password is entered. Optionally, the HF read-write RFID tag has a frequency of use of 13.56 MHz, or the UHF read-write RFID tag has a frequency of use of 915 MHz.

Preferably, the anti-counterfeiting code device is contained in a Bluetooth transmitting device, the Bluetooth transmitting device comprising: a button battery, disposed at the pedestal of the Bluetooth transmitting device, non-conductive fragile paper, connected with a brace and covering the positive electrode of the button battery, and a conductive stripe, disposed at the upper end of the non-conductive fragile paper and connected to the negative electrode of the button battery via a conductive, mobile fixed member, wherein, after the non-conductive fragile paper is torn by the brace, the conductive stripe is in communication with the positive electrode of the button battery, the Bluetooth transmitting device emits a Bluetooth code in an effective communication range, and the Bluetooth transmitting device the Bluetooth transmitting device emits the anti-counterfeiting code.

Preferably, the electronic anti-counterfeiting system further comprises: at least one logistics code and anti-counterfeiting code generator, adapted for generating a pair of the logistics code and the anti-counterfeiting code, which are associated with each other, for the goods after the manufacturer of the goods produces the goods; and at least one recording terminal, adapted for enabling the manufacturer, transportation provider or distributor of the goods to scan or read the logistics code and the data information of the goods, and to upload the data information to the server.

Preferably, the query terminal comprises: a first RF readout unit and/or a first camera lens and/or a first Bluetooth readout unit, adapted for reading the anti-counterfeiting code, or, a first keyboard, adapted for entering the anti-counterfeiting code, a first sending device, adapted for sending the anti-counterfeiting code to the server, and a first display and/or a first amplifier, adapted for displaying and/or issuing query result information returned from the server.

Preferably, the recording terminal comprises: a second RF readout unit and/or a second camera lens and/or a second Bluetooth readout unit, adapted for reading the logistics code and logistics information associated with the goods, and a second sending device, which sends the logistics information to the server.

Preferably, the query result information includes one of the following: a) the anti-counterfeiting code is incorrect, and there is no information related to the goods, b) the anti-counterfeiting code may be an error code, and the goods may be a counterfeit, c) the anti-counterfeiting code is correct, but the goods is not for sale, the anti-counterfeiting code may be an error code, and the goods may be a counterfeit or stolen goods, d) the anti-counterfeiting code is correct, and the number of times the anti-counterfeiting code is queried and the selling time are provided, e) the anti-counterfeiting code is correct, and the data information of the goods is displayed, and/or f) whether there are abnormal queries of the anti-counterfeiting code, and the abnormal queries include queries before sale and multiple queries.

Preferably, the data information includes: production data information, including the manufacturer of the goods, the production plant, the production batch number, the date of manufacture and the check batch number, logistics information, including the information showing that the goods, after leaving the factory, arrives at or leaves a logistics hub, arrives at or leaves the warehouse of a retailer, and arrives at or leaves the Customs and the Inspection Bureau, as well as the information about freight vehicles, cargo planes and ships, and sales information, including the information about the wholesale and/or retail of the goods for sale, and/or the information about the repair and change/return of the goods.

Preferably, the query terminal is a mobile phone, fixed-line phone or desktop computer, the covering is a fragile sticker or swipe card, the server further comprises: an automatic voice query module, which receives the anti-counterfeiting code sent by the mobile phone, fixed-line phone or desktop computer and broadcasts the query result information by voice, and a webpage query module, which provides a webpage query interface, the webpage query module receiving the anti-counterfeiting code sent by the mobile phone, fixed-line phone or desktop computer and displaying the query result information on the webpage query interface.

Preferably, the sales terminal comprises: a third RF readout unit and/or a third camera lens and/or a third keyboard and/or a third Bluetooth readout unit, adapted for reading the logistics code, or a third keyboard, adapted for entering the logistics code, and a third sending device, adapted for sending the logistics code to the server and providing the sales information of the goods.

Preferably, the third RF readout unit of the sales terminal uses the password provided by the server to send a command to the HF or UHF read-write RFID tag of the anti-counterfeiting code device to activate the anti-counterfeiting code device.

In a further aspect, the invention proposes an electronic anti-counterfeiting method for checking the authenticity of goods, characterized in that the goods has a unique logistics code which is set in one or more logistics code devices and a unique anti-counterfeiting code which is set in an anti-counterfeiting code device, and the electronic anti-counterfeiting method is carried out by an electronic anti-counterfeiting system, which comprises: a server disposed in a data center, the server comprising a database, at least one sales terminal in communication with the server, and at least one query terminal in communication with the server, the electronic anti-counterfeiting method comprising: a storing step, wherein the database of the server stores the information about the logistics code and the anti-counterfeiting code of goods and the goods' production, transportation, sales and authenticity information corresponding to the information about the logistics code and the anti-counterfeiting code, a recording step, wherein, after reading the logistics code of the goods, the sales terminal sends to the server such information that the goods is sold, and a querying step, wherein, after reading the anti-counterfeiting code of the goods, the query terminal sends the anti-counterfeiting code to the server to gain access to query result information returned from the server.

Preferably, the logistics code device is disposed on the packaging of the goods, and the anti-counterfeiting code device is disposed within the packaging of the goods and/or on the goods.

Preferably, the logistics code device comprises: a printed text, barcode and/or QR code as the logistics code, or the logistics code device comprises a RFID tag, which stores the logistics code, or the logistics code device comprises a Bluetooth transmitting device, which stores the logistics code, and the logistics code is stored in one or more of the logistics code devices.

Preferably, the anti-counterfeiting code device comprises: a printed text, barcode and/or QR code as the anti-counterfeiting code, or the anti-counterfeiting code device comprises a RFID tag, which stores the anti-counterfeiting code, or the anti-counterfeiting code device comprises a Bluetooth transmitting device, which stores the anti-counterfeiting code, the anti-counterfeiting code device is removably disposed on the goods or the packaging of the goods, and the anti-counterfeiting code device is damaged when it is removed, and the anti-counterfeiting code is confidential before the process of the sale of the goods is completed.

Preferably, the anti-counterfeiting code is a printed text, barcode and/or QR code, it is printed on the anti-counterfeiting code device, and the anti-counterfeiting code device further comprises a covering which covers over the anti-counterfeiting code, and the covering will be damaged or broken is an attempt is made to remove or open it.

Preferably, the anti-counterfeiting code device is a LF read-only RFID tag, the anti-counterfeiting code device comprises an openable RF shielding device, the LF read-only RFID tag is disposed within the RF shielding device, and, when the RFID tag is disposed within a RF shield packaging, the signal emitted by the RFID tag is shielded by the RF shield packaging, and the RF shield packaging is damaged immediately it is opened, and it cannot be repackaged.

Preferably, the RFID tag has a frequency of use of 120 to 150 kHz.

Preferably, the anti-counterfeiting code device is a HF or UHF read-write RFID tag, and the anti-counterfeiting code is stored in the HF or UHF read-write RFID tag, and the HF or UHF read-write RFID tag is activated and issues the anti-counterfeiting code after a default password is entered.

Preferably, the HF read-write RFID tag has a frequency of use of 13.56 MHz, or the UHF read-write RFID tag has a frequency of use of 915 MHz.

Preferably, the anti-counterfeiting code device is a Bluetooth transmitting device, the Bluetooth transmitting device comprises: a button battery, disposed at the pedestal of the Bluetooth transmitting device, non-conductive fragile paper, connected with a brace and covering the positive electrode of the button battery, and a conductive stripe, disposed at the upper end of the non-conductive fragile paper and connected to the negative electrode of the button battery via a conductive, mobile fixed member, wherein, after the non-conductive fragile paper is torn by the brace, the conductive stripe is in communication with the positive electrode of the button battery, the Bluetooth transmitting device emits a Bluetooth code in an effective communication range, and the Bluetooth transmitting device the Bluetooth transmitting device emits the anti-counterfeiting code.

Preferably, the electronic anti-counterfeiting system further comprises at least one logistics code and anti-counterfeiting code generator, and at least one recording terminal, the electronic anti-counterfeiting method further comprises: an associating step, wherein a pair of the logistics code and the anti-counterfeiting code, which are associated with each other, are generated for the goods after the manufacturer of the goods produces the goods, and a recording step, wherein the manufacturer, transportation provider or distributor of the goods scans or reads the logistics code and the data information of the goods, and uploads the data information to the server.

Preferably, the query terminal comprises a first RE readout unit and/or a first camera lens and/or a first keyboard and/or a first Bluetooth readout unit, a first sending device, and a first display and/or a first amplifier, the querying step further comprises: the first RF readout unit, the first camera lens and the first Bluetooth readout unit reading the anti-counterfeiting code, or the first keyboard being used for entering the anti-counterfeiting code, the first sending device sending the anti-counterfeiting code to the server, and the first display and/or the first amplifier displaying and/or issuing query result information returned from the server.

Preferably, the recording terminal comprises a second RE readout unit and/or a second camera lens and/or a second Bluetooth readout unit and a second sending device, the second RE readout unit, the second camera lens and the second Bluetooth readout unit reading the logistics code and logistics information associated with the goods, and the second sending device sending the logistics information to the server.

Preferably, the query result information includes: the anti-counterfeiting code is incorrect, and there is no information related to the goods, the anti-counterfeiting code may be an error code, and the goods may be a counterfeit, the anti-counterfeiting code is correct, but the goods is not for sale, the anti-counterfeiting code may be an error code, and the goods may be a counterfeit or stolen goods, the anti-counterfeiting code is correct, and the number of times the anti-counterfeiting code is queried and the selling time are provided, the anti-counterfeiting code is correct, and the data information of the goods is displayed, and/or whether there are abnormal queries of the anti-counterfeiting code, and the abnormal queries include queries before sale and multiple queries.

Preferably, the data information includes: production data information, including the manufacturer of the goods, the production plant, the production batch number, the date of manufacture and the check batch number, logistics information, including the information showing that the goods, after leaving the factory, arrives at or leaves a logistics hub, arrives at or leaves the warehouse of a retailer, and arrives at or leaves the Customs and the Inspection Bureau, as well as the information about freight vehicles, cargo planes and ships, and sales information, including the information about the wholesale and/or retail of the goods for sale, and/or the information about the repair and change/return of the goods.

Preferably, the query terminal is a mobile phone, fixed-line phone or desktop computer, the covering is a fragile sticker or swipe card, the server further comprises: an automatic voice query module, which receives the anti-counterfeiting code sent by the mobile phone, fixed-line phone or desktop computer and broadcasts the query result information by voice, and a webpage query module, which provides a webpage query interface, the webpage query module receiving the anti-counterfeiting code sent by the mobile phone, fixed-line phone or desktop computer and displaying the query result information on the webpage query interface.

Preferably, the sales terminal comprises a third RF readout unit and/or a third camera lens and/or a third keyboard and/or a third Bluetooth readout unit and a third sending device, the querying step further comprises: the third RF readout unit, the third camera lens and the third Bluetooth readout unit reading the logistics code, or the third keyboard for entering the logistics code, and the third sending device sending the logistics code to the server and providing the sales information of the goods.

Preferably, the third RF readout unit of the sales terminal uses the password provided by the server to send a command to the HF or UHF read-write RFID tag of the anti-counterfeiting code device to activate the anti-counterfeiting code device.

In a further aspect, the invention proposes an electronic anti-counterfeiting system is configured to comprise: a server disposed in a data center, the server comprising a database which stores the information about the logistics code and the anti-counterfeiting code of goods and the goods' production, transportation, sales and authenticity information corresponding to the information about the logistics code and the anti-counterfeiting code, after reading the logistics code of the goods, the sales terminal sends to the server such information that the goods is sold and/or sends to the query terminal the anti-counterfeiting code of the goods, and after reading the anti-counterfeiting code of the goods, the query terminal sends the anti-counterfeiting code to the server to gain access to query result information returned from the server.

Preferably, a unique logistics code of the goods is provided on the packaging of the goods, a unique anti-counterfeiting code of the goods is provided on the goods and/or within the packaging of the goods, thus, the genuineness of the goods and the related commodity information can be queried by the anti-counterfeiting code of the goods, thereby improving the reliability of querying the genuineness of goods using the anti-counterfeiting code. In addition, the logistics code can be utilized to record the entire distribution process of the goods from production to consumers. Further, the anti-counterfeiting code is kept confidential before the sale of goods by covering the printed anti-counterfeiting code with a covering, or by packaging a RFID tag with a RF shielding device to prevent radio-frequency leakage, or closing a Bluetooth transmitting device by power separation, etc. Therefore, the present invention not only makes it sure that the genuineness of the goods can be queried, but also provides more information for consumers, and particularly provides consumers with the corresponding information that can be provided, for their reference, when the same goods is queried more than once, thereby solving the counterfeiting problem caused by the lax confidentiality and leakage of electronic counterfeiting codes in the prior art.

EMBODIMENTS

Figure 1:
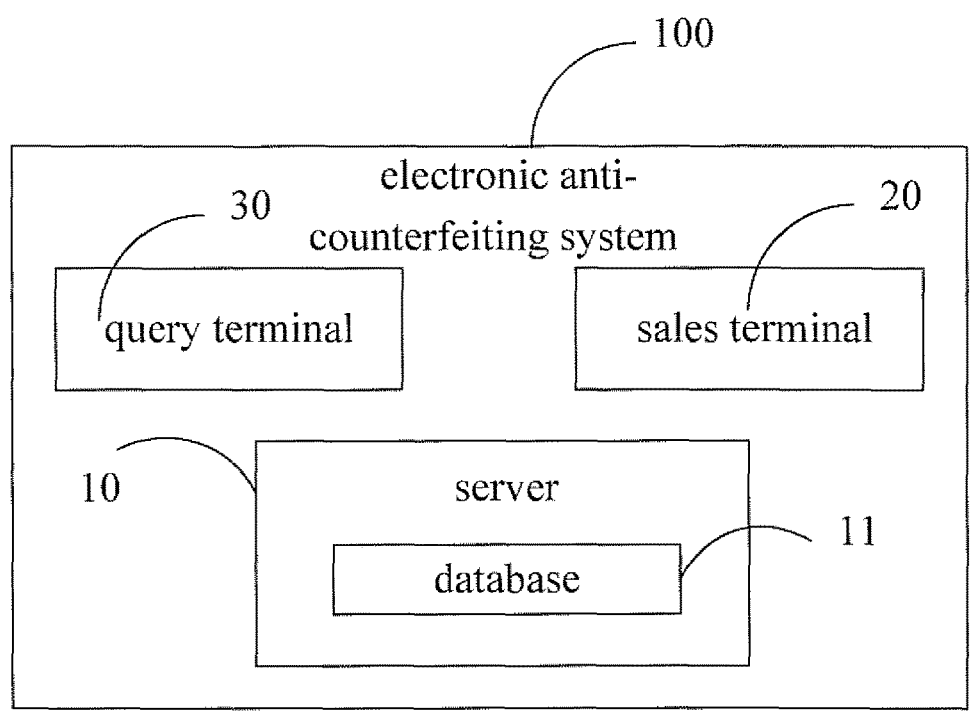
FIG. 1 is a schematic view illustrating the composition of an electronic anti-counterfeiting system as provided in one example of the present invention.

To make the object, technical solutions and advantages of the present invention clearer, embodiments of the present invention is further described in detail hereinafter with reference to the accompanying drawings and embodiments. It should be appreciated that the embodiments described herein are only intended to illustrate the present invention but do not limit it the scope of the claims.

In order to facilitate further discussion, the following terms are used in this specification:

a. Product: referring to a generic term which describes the same type of goods that have the same appearance.

b. Goods: referring to every individual object for sale, such as a single bottle of XO wine or an iPhone6, wherein every piece of goods has its one or more unique codes, for example, iPhone6 has a serial number, IMEI, and a unique address of WiFi that is attached to it, etc.; in order for the anti-counterfeiting function of the present invention, every piece of goods has two unique codes: a logistics code and an anti-counterfeiting code (tracking code).

c. Logistics Code: referring to a unique code for every piece of goods; after the production process, including packaging, of every piece of goods is completed, the logistics code is determined; a logistics code is public information, and it can be printed and stored in the manner of a RFID tag, etc., and be stuck to the outside of the packaging of the goods, and/or printed on logistics forms, including a delivery note and so on.

d. Anti-counterfeiting Code: referring to a unique code for every piece of goods; after the production process, including packaging, of every piece of goods is completed, the anti-counterfeiting code is determined; an anti-counterfeiting code is confidential information, it can be stuck to the inside of the packaging of the goods in such a way that it can only be disclosed in an irreversible way, and it is configured such that it cannot be stuck to another piece of goods after the goods is removed.

e. Packaging is damaged: Every device has a packaging which will be damaged immediately it is opened, and the packaging includes an anti-counterfeiting code packaging and a covering for the anti-counterfeiting code; a consumer will find that the packaging is damaged immediately he/she opens the packaging of goods, so hefshe can determine that the goods has been opened or replaced.

FIGS. 1 to 4 shows an electronic anti-counterfeiting system 100 for authenticating goods, wherein each piece of goods has a unique logistics code set in one or more logistics code devices, A unique anti-counterfeiting code (also known as tracking code) is set in an anti-counterfeiting code device.

The electronic anti-counterfeiting system 100 comprises a server 10 disposed in a data centre. The server 10 comprises a database 11 which stores logistics codes, anti-counterfeiting codes of goods, information on goods' production, transportation, sales, and authenticity information corresponding to the logistics codes and the anti-counterfeiting codes.

The system also comprises a sales terminal 20 in communication with the server 10, which is capable of indicating to the server 10 that a particular piece of goods has been sold as soon as the sales terminal 20 has read the logistics code of the goods.

Furthermore, the system comprises a query terminal 30 in communication with the server 10, such that it is capable of sending the anti-counterfeiting code to the server 10 to gain access to query result information returned from the server 10 after the query terminal 30 has read the anti-counterfeiting code of the goods.

The server 10 is disposed in a data center or in one or more data centers in which case the plurality of data centers are connected by a cloud network.

Both the sales terminal 20 and the query terminal 30 are in communication with the server 10. The sales terminal 20 indicates to the server 10 that goods have been sold when it reads the logistics code of the goods.

On reading the anti-counterfeiting code of the goods, the query terminal 30 sends the anti-counterfeiting code to the server 10 to gain access to query result information returned from the server 10. In an alternative embodiment, the query terminal 30 reads the logistics code of the goods, and sends the logistics code to the server 10 to gain access to logistics information of the goods, so as to get to know the production and distribution processes of the goods.

The shortcomings of the prior art can be solved by the technical solution of this example. In addition, because the logistics code is set in one or more logistics code devices and the anti-counterfeiting code is set in an anti-counterfeiting code device. The anti-counterfeiting code can be effectively protected from being obtained or used by an illegal user.

Typically, the logistics code device is disposed on the packaging of the goods, and the anti-counterfeiting code device is disposed within the packaging of the goods and/or on the goods. Records of the production and distribution of goods can be retrieved by logistics code devices.

In addition, the provision of an electronic method for checking the authenticity of goods not only helps users identify the authenticity of goods, but also specially provides more information for consumers, e.g., provides users with the relevant goods information among the query result information, especially provides information when the same goods is queried many times, and also keeps it confidential and prevents the counterfeiting problem caused by the leakage of the inquiry access code.

For example, the query result may include the following: that a) the anti-counterfeiting code is incorrect, but there is no information related to the goods;

b) the anti-counterfeiting code may be an error code, and the goods may be a counterfeit;

c) the anti-counterfeiting code is correct, but the goods is not for sale, d) the anti-counterfeiting code may be an error code, and the goods may be a counterfeit or stolen goods;

e) the anti-counterfeiting code is the correct code, and the number of times the anti-counterfeiting code is queried and the selling time are provided;

f) the anti-counterfeiting code is correct, and the data information of the goods is displayed; and/or whether there are abnormal queries of the anti-counterfeiting code, and the abnormal queries include queries before sale and multiple queries.

The logistics code stored in the logistics code device may be in various forms, such as a printed text, barcode and/or QR code. Of course, the logistics code device may also comprise a RFID tag, which stores the logistics code. Further, the logistics code device may also be a Bluetooth transmitting device which also has the logistics code stored therein. Generally, the logistics code may be stored in one or more of the logistics code devices.

In order to make it convenient to track goods, two or more barcodes, or both a barcode and a RFID tag, are stuck to the outside of the packaging, i.e., the logistics code may be stored in one or more of the logistics code devices.

The anti-counterfeiting code may be stored in anti-counterfeiting code devices in various forms. For example, the anti-counterfeiting code may be a printed text, barcode and/or QR code may be used as the anti-counterfeiting code. Specifically, when the anti-counterfeiting code is a printed text, barcode and/or QR code, it is printed on the anti-counterfeiting code device. Alternatively, the anti-counterfeiting code device may comprise a Bluetooth transmitting device, a RFID tag and the like, wherein the anti-counterfeiting code is stored in the Bluetooth transmitting device or RFID tag.

Preferably, the anti-counterfeiting code device is a single use device which is designed to be damaged and become un-useable when it is removed from its affixation to the product. For example, the anti-counterfeiting code device further comprises a covering which covers over the anti-counterfeiting code, and the covering will be damaged or broken is an attempt is made to remove or open it. For instance, the covering is eggshell paper or the like.

Typically, the anti-counterfeiting code is already confidential before sale of the piece of product.

In a variation of the embodiment, the anti-counterfeiting code device is a LF read-only RFID tag, the anti-counterfeiting code device comprises an open-able RF shielding device, the LF read-only RFID tag is disposed within the RF shielding device, and, when the RFID tag is disposed within a RF shield packaging, the signal emitted by the RFID tag is shielded by the RE shield packaging; and the RE shield packaging is damaged immediately it is opened, and it cannot be repackaged.

Figure 5:
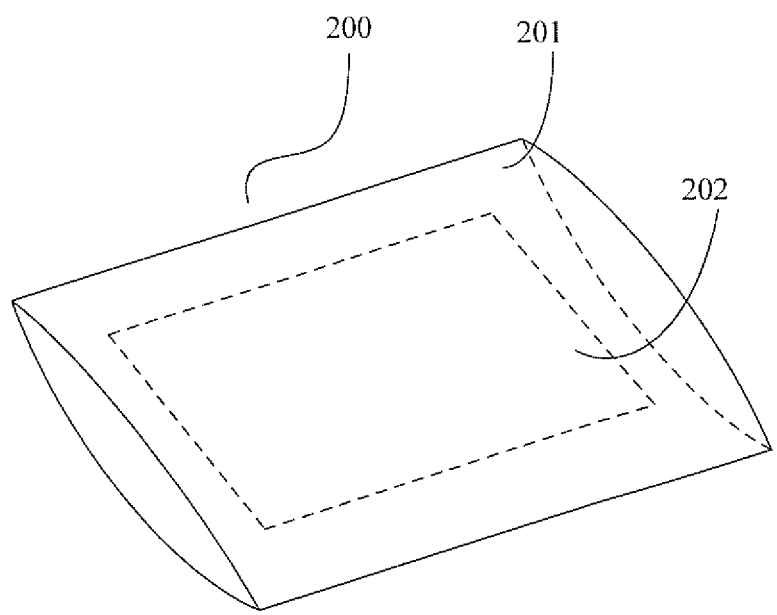
FIG. 5 is a schematic view illustrating the structure of a RF shielding device as provided in one example of the present invention.

As shown in FIG. 5, the mark number 200 in this figure refers to a RF shielding device, the mark number 201 refers to a RF shield packaging, and the mark number 202 refers to a RFID tag. The RE shield packaging is damaged immediately if is opened, and it cannot be repackaged. Thus, a user can tell whether a RF shielding device has already been tampered with.

The RE shield packaging may be an anti-radio shielding device made of materials such as iron and/or lead. Wherein, the RFID tag has a frequency of use of 120 to 150 kHz.

Preferably, the logistics code and/or the anti-counterfeiting code are stored in the RFID tag. The anti-counterfeiting code may be removably affixed to the inner packing of the goods or directly onto the goods. The anti-counterfeiting code is designed to be damaged when it is removed from the RFID tag.

The query terminal 30 is a low RF reading device, which, after scanning the undamaged anti-counterfeiting code, sends the anti-counterfeiting code information to the server 10. Typically, if the low RE reading device is scanning a damaged anti-counterfeiting code, it will be unable to retrieve the anti-counterfeiting code.

The anti-counterfeiting code is typically a read-write RFID tag stored in memory of a HF RFID device, and may be removably stuck to the inner packing of the goods or directly to a piece of goods. The anti-counterfeiting code is designed to be damaged when it is removed from its location of affixation.

The query terminal 30 is a high RE reading device, which sends the anti-counterfeiting code to the server 10 after the purchase and payment of the goods are completed and after the default password has been correctly entered. The high RF reading device does not send the anti-counterfeiting code stored therein to the server 10 before completion of the purchase and payment of the In a variation of the embodiment, the anti-counterfeiting code is stored in a radio frequency identification (RFID) tag, which is a 120-150 kHz read-only RFID tag.

When the query terminal 30 is a low RF reading device, after the low RF reading device scans the undamaged anti-counterfeiting code, it sends the anti-counterfeiting code information to the server 10. If the anti-counterfeiting code is damaged, query terminal 30 is unable to read the anti-counterfeiting code. Therefore, the authenticity of the information query as to whether the goods is genuine is guaranteed. When the query terminal 30 is used, what is employed in one embodiment is a RFID device which tends to be broken once it is torn, i.e., any person with intent to remove the RFID device from the packaging of goods, the RFID device will be destroyed.

A low RFID device has a very narrow effective communication range, which is at most about 10 cm and which may be shorter after further adjustment. For some goods with relatively large packages, low RFID devices are placed approximately in the middle of the packages, so the anti-counterfeiting codes cannot be read from outside before unpacking. Low RFID devices can be applied to large household appliances, such as desktop computers and refrigerators. However, high RFID devices include HF (13.56 MHz), VHF (860-960 MHz) or UHF (2.45 GHz) RFID devices. Due to the read-write function, the anti-counterfeiting code can only be activated at the sales terminal 20. This is to avoid the leakage of the anti-counterfeiting code before the sale of genuine goods. In general, HF, VHF and UHF RFID devices have relatively wide effective communication ranges, but they still can be adjusted to have narrower effective communication ranges in order to apply the present invention.

In this example, a HF (13.56 MHz) read-write tag may be used for the radio frequency identification of an anti-counterfeiting code, and a password must be used to alter the content of the radio frequency tag. When goods is leaving the factory, the anti-counterfeiting code of an anti-counterfeiting system is written into the memory of a RFID device, and the RFID tag is set such that it is readable but not writable and the anti-counterfeiting code stored therein cannot be read. When the goods is for sale, the sales terminal 20 of the anti-counterfeiting system is provided with a reader-writer for a RFID device, and the RFID device is modified by a default password such that it is playing the anti-counterfeiting code of the anti-counterfeiting system while it is broadcasting. In this embodiment, owing to the use of a RFID device, before the sale of goods, RFID readers in the vicinity fail to read the anti-counterfeiting code of the anti-counterfeiting system so that data leakage is prevented, and only after the selling process of the goods, including the process of payment of the goods, is completed, and RFID update is completed by the sales terminal 20 of the anti-counterfeiting system, can a consumer query the goods.

Preferably, the anti-counterfeiting code device is a HF or UHF read-write RFID tag, in which the anti-counterfeiting code is stored; the HF or UHF read-write RFID tag is activated and issues the anti-counterfeiting code after a default password is entered. The HE read-write RFID tag has a frequency of use of 13.56 MHz; or the UHF read-write RFID tag has a frequency of use of 915 MHz. Of course, in one embodiment of the present invention, the sales terminal 20 may also be a low or high RF reading device like the query terminal 30 described in the examples as mentioned above. By reading the corresponding RFID tag, the anti-counterfeiting code device identifies an anti-counterfeiting code, etc.

Figure 2:
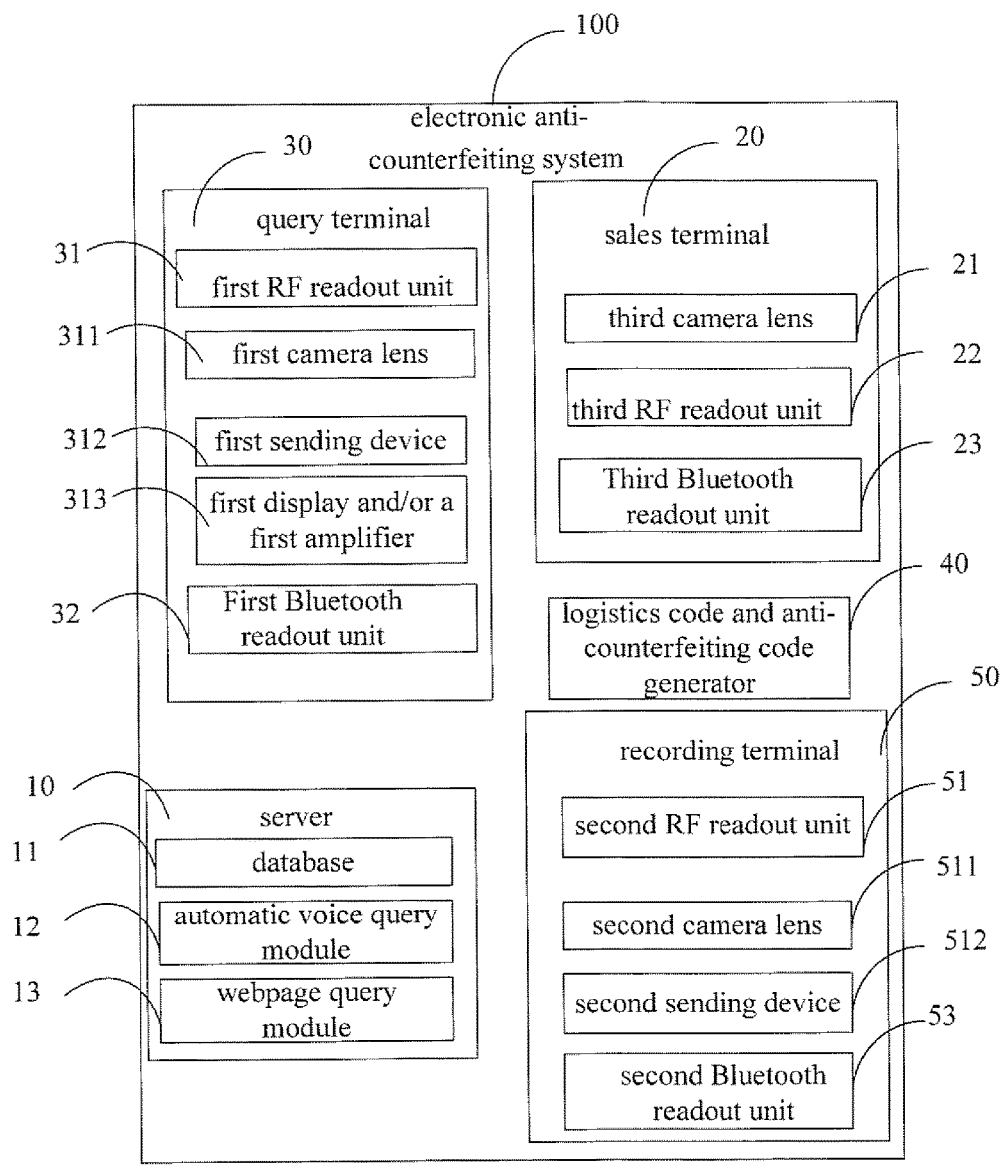
FIG. 2 is a schematic view illustrating the composition of an electronic anti-counterfeiting system as provided in one example of the present invention.

Referring to FIG. 2, in one example of the present invention, the query terminal 30 comprises:

a first RF readout unit 31 and/or a first camera lens 311 and/or a first keyboard and/or a first Bluetooth readout unit 32, a first sending device, and a first display and/or a first amplifier; or a first keyboard, adapted for entering the anti-counterfeiting code;

a first sending device 312, adapted for sending the anti-counterfeiting code to the server 10; and a first display and/or a first amplifier 313, adapted for displaying and/or issuing query result information returned from the server 10.

In this example, the logistics code is a printed text, barcode and/or QR code; the anti-counterfeiting code is a printed text, barcode and/or QR code; the logistics code and the anti-counterfeiting code are separately printed on stickers; the anti-counterfeiting code is covered by a covering, which will be damaged if an attempt to remove or open it is made. Thus, the first RF readout unit 31 and/or the first camera lens 311 and/or the first Bluetooth readout unit 32 scans or reads a printed text, barcode and/or QR code through the first camera lens 311, and the corresponding logistics code or anti-counterfeiting code is sent to the server 10 through the first sending device 312. After receiving the query result information returned from the server 10, the first display and/or a first amplifier 313 displays the relevant query information, or issues a voice message associated with the query information. The sales terminal 20 comprises a camera lens or another device for reading a logistics code in the form of a printed text, a barcode or the like, and the sales terminal 20 further comprises a real-time or batch on-line function to upload the read information to the database 11 and to update the status of goods, including sale of goods in the store, return of goods in the store, etc. Further, if the logistics code is formed by other technologies, including RFID and Bluetooth beacon, etc., the sales terminal 20 further comprises a match reading device.

Figure 4:
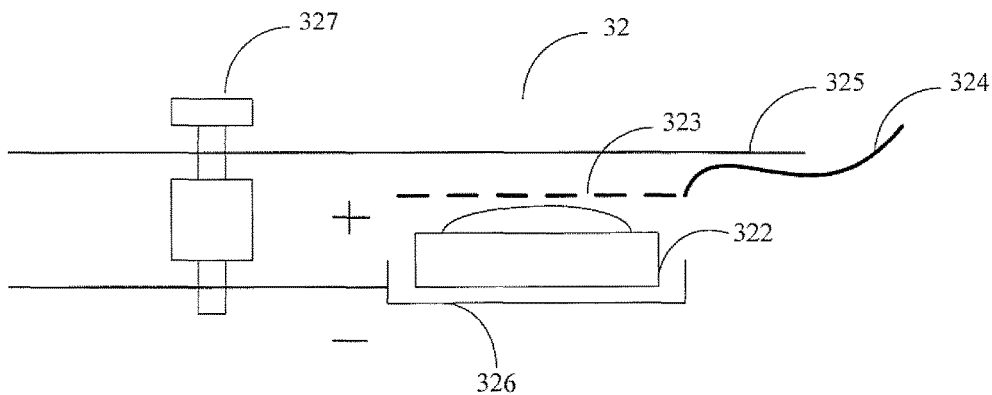
FIG. 4 is a schematic view illustrating the structure of the first Bluetooth readout unit of an electronic anti-counterfeiting system as provided in one example of the present invention.

Referring to FIG. 4, preferably, the first Bluetooth readout unit 32 further comprises: a button battery 322, disposed at the pedestal 326 of the first Bluetooth readout unit 32; non-conductive fragile paper 323, connected with a brace 324 and covering the positive electrode of the button battery 322; and a conductive stripe 325, disposed at the upper end of the non-conductive fragile paper 323 and connected to the negative electrode of the button battery 322 via a conductive, mobile fixed member 327.

In this example, the first Bluetooth readout unit 32 is an anti-counterfeiting code Bluetooth iBeacon device, and it is the button battery 322 that supplies power to the anti-counterfeiting code Bluetooth iBeacon device. The button battery 322 is mounted in the conductive pedestal 326 with a pit. The upper portion of the button battery 322 is pressed by a conductive stripe 325, and may be pressurized by a mobile fixed member 327, such as a spring or a screw. There is a piece of non-conductive fragile paper 323 between the conductive strip 325 and the button battery 322 with a positive electrode, and after a consumer bought the goods, the conductive strip 325 made of fragile paper is brought into a contact with the positive electrode of the button battery 322 for electric conduction. Wherein, the logistics code and/or the anti-counterfeiting code are Bluetooth Beacon codes. When the anti-counterfeiting code is a Bluetooth iBeacon code, after the non-conductive fragile paper 323 is torn by the brace 324, the conductive strip 325 is in communication with the positive electrode of the button battery 322, and the first Bluetooth readout unit 32 sends the Bluetooth iBeacon code to the server.

Specifically, the anti-counterfeiting code is a unique code for Bluetooth iBeacon, the unique code for Bluetooth iBeacon consists of proximity UUID, Major Code and Minor Code, and Bluetooth iBeacon is powered by a button battery. Said Bluetooth iBeacon does not need to be turned on when the manufacturer is recording the anti-counterfeiting code and packaging of goods right before it leaves the factory. Further, the button battery 322 is restricted by the non-conductive fragile paper 323, said Bluetooth iBeacon is turned on by electric conduction caused by tearing the brace 324, so that an iBeacon code is issued. By virtue of this solution, the anti-counterfeiting code is kept confidential before the goods is for sale.

In one example of the present invention, the electronic anti-counterfeiting system 100 further comprises: at least one logistics code and anti-counterfeiting code generator 40, adapted for generating a pair of the logistics code and the anti-counterfeiting code, which are associated with each other, for the goods after the manufacturer of the goods produces the goods; and at least one recording terminal 50, adapted for enabling the manufacturer, transportation provider or distributor of the goods to scan or read the logistics code and the data information of the goods, and to upload the data information to the server 10.

In this example, the logistics code and anti-counterfeiting code generator 40 is provided for the manufacturer, and only after the manufacturer has the goods produced, will a pair of the logistics code and the anti-counterfeiting code, which are associated with each other, be generated for the goods, thereby guaranteeing the uniqueness of the logistics code and the anti-counterfeiting code and ensuring that they will not be tampered with. The recording terminal 50 can be used by all the manufacturers, transportation providers or distributors involved during the distribution of the goods. These manufacturers, transportation providers or distributors use the recording terminal 50 to scan the logistics code and the data information of the goods, and upload the data information to the server 10. The logistics code is a printed text, barcode and/or QR code; it is generally provided on the outer packing of the goods. The anti-counterfeiting code is covered by a covering, which will be damaged or broken is an attempt is made to remove or open it. For example, in one embodiment, goods is bought from a store and the anti-counterfeiting code is exposed after one or more layers of packaging of the goods are opened, but the anti-counterfeiting code on the packaging might be exposed in an irreversible, destructive manner in order to get the anti-counterfeiting code to check the authenticity of the goods. This arrangement further enables a consumer to be aware that the goods has been opened before. Moreover, the anti-counterfeiting code is mounted within the goods, such that, when a consumer or another person tries to remove the anti-counterfeiting code and stick it to other goods, the anti-counterfeiting code will be damaged and cannot be re-used.

In another embodiment, the anti-counterfeiting code is associated with every piece of goods during production, and the anti-counterfeiting code is mounted within the packaging of goods, for example, it is stuck to the inner wall of the packaging of goods or the inner layer of a multilayer packaging, or stuck to unpackaged goods; roughly when goods is not for sale, consumers or other people cannot access the anti-counterfeiting code. The initial anti-counterfeiting code is kept confidential, or is applied to some goods as a sticker for a multilayered seal. In both cases, the anti-counterfeiting code also needs be exposed in irreversible ways, including a destructive force.

In another embodiment, the anti-counterfeiting code is printed as a text, barcode, two-dimensional barcode or QR code. The tracking code is covered by swipe card technology, or is covered by fragile paper. After a consumer, who intends to open up the covered tracking code to check the authenticity of goods, clears the swipe card or tears the covering paper, the consumer cannot stick the covering to the goods any longer. In this case, when a consumer sees that the anti-counterfeiting code is exposed after opening the goods, the consumer cannot determine the accuracy of further queries.

Preferably, the data information includes: production data information, including the manufacturer of the goods, the production plant, the production batch number, the date of manufacture and the check batch number; logistics information, including the information showing that the goods, after leaving the factory, arrives at or leaves a logistics hub, arrives at or leaves the warehouse of a retailer, and arrives at or leaves the Customs and the Inspection Bureau, as well as the information about freight vehicles, cargo planes and ships; and sales information, including the information about the wholesale and/or retail of the goods for sale, and/or the information about the repair and change/return of the goods.

Thus, consumers as well as goods vendors, transport providers and other relevant staff can get to know the production information, logistics information, sales information and other information of the goods.

In the sixth example of the present invention, the recording terminal 50 comprises: a second RF readout unit 51 and/or a second camera lens 511 and/or a second Bluetooth readout unit 53, adapted for reading the logistics code and logistics information associated with the goods; and a second sending device 512, which sends the logistics information to the server.

In this example, the recording terminal 50 has a lens (camera lens) or another device (e.g., a Bluetooth device) for reading a printed text, a barcode or a logistics code in any other form, and the recording terminal 50 further comprises a real-time or batch on-line function to upload the read information to the database 11; after goods leaves the factory, employees in logistics companies, employees in retailers or other staff who need to deal with the goods read the logistics code through the recording terminal 50, and updates the status of the goods, including: arriving at Huangpu Port Customs, leaving Logistics Center of Guangzhou Airport, and arriving at Sales Center in Guangzhou Panyu, etc. If the logistics code is formed by other technologies, including RFID and Bluetooth beacon, etc., the recording terminal 50 further comprises a matched reading device.

In one example of the present invention, the sales terminal 20 comprises: a third RF readout unit 22 and/or a third camera lens 21 and/or a third Bluetooth readout unit 23, adapted for reading the logistics code; or a third keyboard, adapted for entering the logistics code; and a third sending device 36, adapted for sending the logistics code to the server 10 and providing the sales information of the goods.

In this embodiment, both the sales terminal 20 and the recording terminal 50 can be Bluetooth devices, which read the logistics code and send it to the server 10 to query about the corresponding logistics information. In addition, the third RF readout unit 22 of the sales terminal 20 uses the password provided by the server 10 to send a command to the HF or UHF read-write RFID tag of the anti-counterfeiting code device to activate the anti-counterfeiting code device.

Referring to FIG. 2, in one example of the present invention, the query terminal 30 is a mobile phone, fixed-line phone or desktop computer; the covering is a fragile sticker or swipe card; the server 10 further comprises: an automatic voice query module 12, which receives the anti-counterfeiting code sent by the mobile phone, fixed-line phone or desktop computer and broadcasts the query result information by voice; and a webpage query module 13, which provides a webpage query interface, the webpage query module 13 receiving the anti-counterfeiting code sent by the mobile phone, fixed-line phone or desktop computer and displaying the query result information on the webpage query interface.

In this embodiment, the server 10 of the electronic anti-counterfeiting system 100 further comprises an automatic voice query module 12, so that consumers can use mobile phones or fixed-line telephones to make queries by voice. The server 10 of the electronic anti-counterfeiting system 100 further comprises a program which networks with the mobile phones or desktop computers of consumers to allow the consumers to query. The electronic anti-counterfeiting system 100 further comprises a mobile phone program, which enables consumers to query about goods. The program comprises reading a text, barcode or QR code using the lens of a mobile phone, or reading an anti-counterfeiting code using a RFID reader of a mobile phone, and automatically contacting the server 10 of the anti-counterfeiting system to query. The mobile phone is owned by the consumer, and it is provided with a processor, a memory and a mobile communication function. The mobile phone further comprises a lens for reading a text, barcode or QR code. The mobile phone further comprises a RFID readout unit in communication with a RFID device. The anti-counterfeiting system comprises a desktop computer, whereby a consumer can use the desktop computer connected to the Internet to query about goods on the server 10 of the anti-counterfeiting system using a browser. Additionally, the desktop computer also comprises a lens for reading a text, barcode or QR code. The desktop computer further comprises a RFID readout unit in communication with a RFID device. When the query terminal 30 is a fixed-line telephone, the fixed-line telephone automatically broadcasts by voice the result information obtained by a query, wherein the anti-counterfeiting code can be entered using the keypad of the fixed-line telephone, and a reply to the information can be made using the speaker of the fixed-line telephone.

Figure 3:
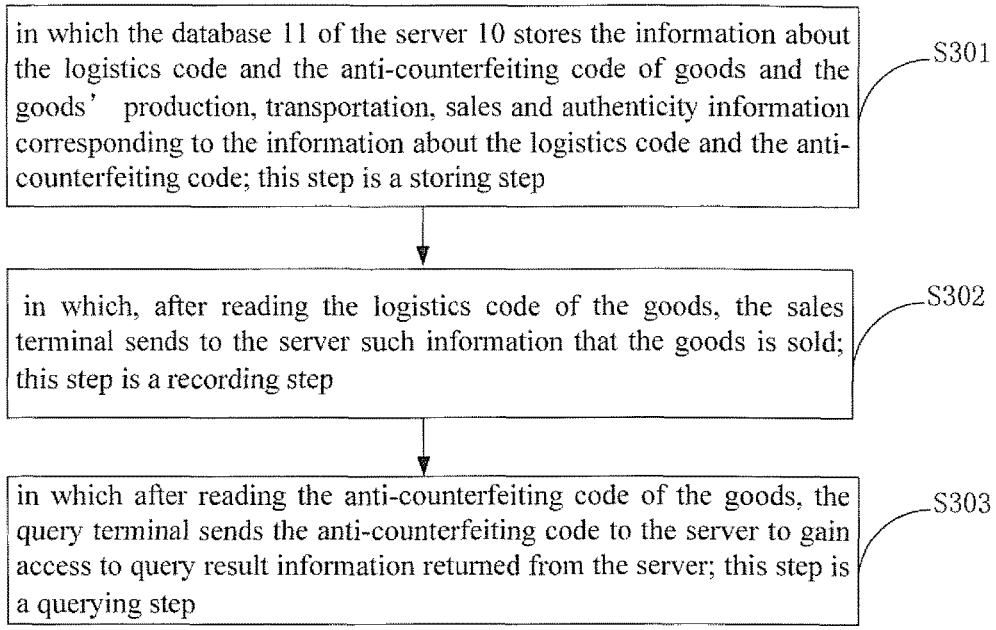
FIG. 3 is a flow chart illustrating an electronic anti-counterfeiting method as provided in one example of the present invention.

Referring to FIG. 3, in one example of the present invention, provided is an electronic anti-counterfeiting method for checking the authenticity of goods, characterized in that the goods has a unique logistics code which is set in one or more logistics code devices and a unique anti-counterfeiting code (also known as tracking code) which is set in an anti-counterfeiting code device, and the electronic anti-counterfeiting method is carried out by an electronic anti-counterfeiting system 100, which comprises: a server 10 disposed in a data center, the server comprising a database 11; at least one sales terminal 20 in communication with the server 10; and at least one query terminal 30 in communication with the server 10; the electronic anti-counterfeiting method comprising:

Step S301, in which the database 11 of the server 10 stores the information about the logistics code and the anti-counterfeiting code of goods and the goods' production, transportation, sales and authenticity information corresponding to the information about the logistics code and the anti-counterfeiting code; this step is a storing step;

Step S302, in which, after reading the logistics code of the goods, the sales terminal sends to the server such information that the goods is sold; this step is a recording step; and Step S303, in which after reading the anti-counterfeiting code of the goods, the query terminal sends the anti-counterfeiting code to the server to gain access to query result information returned from the server; this step is a querying step.

In this example, the goods has a unique logistics code which is set in one or more logistics code devices and a unique anti-counterfeiting code which is set in an anti-counterfeiting code device, whereby the anti-counterfeiting code can be kept confidential effectively, and it is convenient for a user to query about the logistics information of the goods through the logistics code; the database 11 of the server 10 stores the information about the logistics code and the anti-counterfeiting code of the goods and the goods' production, transportation, sales and authenticity information corresponding to the information about the logistics code and the anti-counterfeiting code; in the sales section, after reading the logistics code of the goods, the sales terminal 20 sends to the server 10 such information that the goods is sold, and then the server 10 updates the information of the database 11. Further, after the completion of the sale, the anti-counterfeiting code is activated by the sales terminal 20, and the anti-counterfeiting code of the goods is sent to the query terminal 30, etc.

Alternatively, the anti-counterfeiting code is available without the use of the sales terminal 20 for activation. After a consumer gets goods, the query terminal 30 reads the anti-counterfeiting code of the goods, and then sends the anti-counterfeiting code to the server 10 to gain access to query result information returned from the server.

On the other hand, the query result information includes: the anti-counterfeiting code is incorrect, and there is no information related to the goods; the anti-counterfeiting code may be an error code, and the goods may be a counterfeit; the anti-counterfeiting code is correct, but the goods is not for sale, the anti-counterfeiting code may be an error code, and the goods may be a counterfeit or stolen goods; the anti-counterfeiting code is correct, and the number of times the anti-counterfeiting code is queried and the selling time are provided; the anti-counterfeiting code is correct, and the data information of the goods is displayed; and/or whether there are abnormal queries of the anti-counterfeiting code, and the abnormal queries include queries before sale and multiple queries. Thus, a consumer can get to known the relevant information about the goods while discerning whether the goods is genuine.

In one example of the present invention, the anti-counterfeiting code device comprises: a printed text, barcode and/or QR code as the anti-counterfeiting code; or the anti-counterfeiting code device comprises a RFID tag, which stores the anti-counterfeiting code; or the anti-counterfeiting code device comprises a Bluetooth transmitting device, which stores the anti-counterfeiting code; the anti-counterfeiting code device is removably disposed on the goods or the packaging of the goods, and the anti-counterfeiting code device is damaged when it is removed; and the anti-counterfeiting code is confidential before the process of the sale of the goods is completed.

In this example, like the logistics code, the anti-counterfeiting code stored in the anti-counterfeiting code device may also be in various forms. For example, a printed text, barcode and/or QR code may be used as the anti-counterfeiting code. Specifically, when the anti-counterfeiting code is a printed text, barcode and/or QR code, it is printed on the anti-counterfeiting code device; besides, the anti-counterfeiting code device may further comprise a Bluetooth transmitting device, a RFID tag and the like. The anti-counterfeiting code is stored in the above Bluetooth transmitting device and RFID tag. The anti-counterfeiting code device is damaged and cannot be normally used when it is removed. The anti-counterfeiting code is confidential before the process of the sale of the goods is completed. For example, the anti-counterfeiting code device further comprises a covering which covers over the anti-counterfeiting code, and the covering will be damaged or broken is an attempt is made to remove or open it. For instance, the covering is eggshell paper or the like.

Preferably, the anti-counterfeiting code device comprises a LF read-only RFID tag and an openable RF shielding device, wherein the LF read-only RFID tag is disposed within the RF shielding device, and, when the RFID tag is disposed within a RF shield packaging, the signal emitted by the RFID tag is shielded by the RF shield packaging; and the RF shield packaging is damaged immediately it is opened, and it cannot be repackaged. Wherein, the RFID tag has a frequency of use of 120 to 150 kHz. The RF shield packaging may be an anti-radio shielding device made of materials such as iron and/or lead.

In one example of the present invention, preferably, the logistics code and/or the anti-counterfeiting code is stored in the RFID tag. When the anti-counterfeiting code is a read-only RFID tag, the anti-counterfeiting code may be removably stuck to the inner packing of the goods or directly to the goods, and the anti-counterfeiting code is damaged when it is removed; the query terminal 30 is a low RF reading device, which, after scanning the undamaged anti-counterfeiting code, sends the anti-counterfeiting code information to the server 10; or when the low RF reading device is scanning the damaged anti-counterfeiting code, it is unable to gain access to the anti-counterfeiting code; or the anti-counterfeiting code is a read-write RFID tag stored in memory of a HF RFID device, the anti-counterfeiting code may be removably stuck to the inner packing of the goods or directly to the goods, and the anti-counterfeiting code is damaged when it is removed; the query terminal 30 is a high RF reading device, which sends the anti-counterfeiting code stored therein to the server 10 after the purchase and payment of the goods are completed and after the default password is correctly entered; and the high RE reading device does not send the anti-counterfeiting code stored therein to the server 10 before completion of the purchase and payment of the goods and/or after the default password is correctly entered into the high RE reading device.

In this embodiment, the anti-counterfeiting code is stored in a radio frequency identification (RFID) tag, which is a 120-150 kHz read-only RFID tag. When the query terminal 30 is a low RF reading device, after the low RE reading device scans the undamaged anti-counterfeiting code, it sends the anti-counterfeiting code information to the server 10; when the low RE reading device is scanning the damaged anti-counterfeiting code, it is unable to gain access to the anti-counterfeiting code. Therefore, the authenticity of the information query as to whether the goods is genuine is guaranteed. When the query terminal 30 is used, what is employed in one embodiment is a RFID device which tends to be broken once it is torn, i.e., any person with intent to remove the RFID device from the packaging of goods, the RFID device will be destroyed.

In one embodiment, the anti-counterfeiting code is printed on the covered fragile sticker in the form of a printed text, barcode or QR code, and, after purchasing goods, a consumer opens the packaging, removes the covering, and directly reads the text, barcode or QR code with the camera lens of a mobile phone to query. If the goods is genuine, the query result includes information such as the store where the goods was bought and when the goods was bought, etc.

In one embodiment, the anti-counterfeiting code is printed on the covered fragile sticker in the form of a printed text, barcode or QR code, the anti-counterfeiting code is removably stuck to the packaging of goods, the anti-counterfeiting code must be torn and damaged when there is a need to further open the packaging of the goods, and, after purchasing goods, a consumer opens the packaging, removes the covering, and directly reads the text, barcode or QR code with the camera lens of a mobile phone to query. If the goods is genuine, the query result includes information such as the store where the goods was bought and when the goods was bought, etc. After completion of checking the authenticity of the goods, the consumer decides to use the goods, and only after the consumer tears and damages the anti-counterfeiting code, can he/she open the packaging. In this embodiment, the same anti-counterfeiting code will not be queried more than once.

In a preferred embodiment, the covering which covers the tracking code is a piece of fragile paper with a logistics code printed thereon. Before sale, the logistics code displays the logistics process for updating the goods; after the sale of the goods, a consumer can tear the covering with the logistics code printed thereon to display the tracking code for checking whether the goods is genuine.

In one example of the present invention, the query terminal 30 comprises a first RF readout unit 31 and/or a first camera lens 311 and/or a first keyboard and/or a first Bluetooth readout unit 32; the querying step of the anti-counterfeiting method further comprises: the first RE readout unit 31 and/or the first camera lens 311 and/or the first Bluetooth readout unit 32 reading the logistics code and/or the anti-counterfeiting code; or the first keyboard being used for entering the anti-counterfeiting code; the first sending device 312 sending the anti-counterfeiting code to the server 10; and the first display and/or the first amplifier 313 displaying and/or issuing query result information returned from the server 10.

In the above-mentioned example, the logistics code is a printed text, barcode and/or QR code; the anti-counterfeiting code is a printed text, barcode and/or QR code; the logistics code and the anti-counterfeiting code are separately printed on stickers; the anti-counterfeiting code is covered by a covering, which will be damaged or broken is an attempt is made to remove or open it. Thus, the first RF readout unit 31 and/or the first camera lens 311 and/or the first Bluetooth readout unit 32 scans or reads a printed text, barcode and/or QR code through the first camera lens 311, and the corresponding logistics code or anti-counterfeiting code is sent to the server 10 through the first sending device 312. After receiving the query result information returned from the server 10, the first display and/or a first amplifier 313 displays the relevant query information, or issues a voice message associated with the query information. The sales terminal 20 comprises a camera lens or another device for reading a logistics code in the form of a printed text, a barcode or the like, and the sales terminal 20 further comprises a real-time or batch on-line function to upload the read information to the database 11 and to update the status of goods, including sale of goods in the store, return of goods in the store, etc.

Specifically, the logistics code is associated with every piece of goods during production, the logistics code is public information, and the logistics code can be recorded and displayed by printing or radio transmission. The logistics code can be distributed to the electronic system for logistics and retail in the manner of report or data exchange, along with logistics forms including a shipping document, an air waybill, a delivery note and so on. The shipping and sale schedule of the goods tracked by the logistics code can be updated after an employee of a logistics company or retailor reads data, or the information about the logistics and retail of the said goods can be directly updated at the time of data exchange. Employees of a logistics company can use a mobile terminal of an anti-counterfeiting system to read a single logistics code or a plurality of logistics codes on reports such as a shipping document, an air waybill and a delivery note.

In one example of the present invention, the first Bluetooth readout unit 32 further comprises: a button battery 322, disposed at the pedestal 326 of the first Bluetooth readout unit 32; non-conductive fragile paper 323, connected with a brace 324 and covering the positive electrode of the button battery 322; and a conductive stripe 325, disposed at the upper end of the non-conductive fragile paper 323 and connected to the negative electrode of the button battery 322 via a conductive, mobile fixed member 327. In the above-mentioned example, the logistics code and/or the anti-counterfeiting code are Bluetooth iBeacon codes. When the anti-counterfeiting code is a Bluetooth iBeacon code, after the non-conductive fragile paper 323 is torn by the brace 324, the conductive strip 325 is in communication with the positive electrode of the button battery 322, and the first Bluetooth readout unit 32 sends the Bluetooth iBeacon code to the server. In one example of the present invention, the logistics code and/or the anti-counterfeiting code is stored in the RFID tag.

When the anti-counterfeiting code is a read-only RFID tag, the anti-counterfeiting code may be removably stuck to the inner packing of the goods or directly to the goods, and the anti-counterfeiting code is damaged when it is removed.

The querying step comprises: the query terminal 30 is a low RF reading device, which, after scanning the undamaged anti-counterfeiting code, sends the anti-counterfeiting code information to the server; or when the low RF reading device is scanning the damaged anti-counterfeiting code, it is unable to gain access to the anti-counterfeiting code; or the anti-counterfeiting code is a read-write RFID tag stored in memory of a HF RFID device, the anti-counterfeiting code may be removably stuck to the inner packing of the goods or directly to the goods, and the anti-counterfeiting code is damaged when it is removed.

The querying step comprises: the query terminal 30 is a high RF reading device, which sends the anti-counterfeiting code stored therein to the server after the purchase and payment of the goods are completed and after the default password is correctly entered.

In the above-mentioned example, the anti-counterfeiting code is stored in a HF read-write RFID device. When a consumer is buying goods, the sales terminal 20 of the retail store sends a written instruction to the RFID device, in which the anti-counterfeiting code is stored, using a matched password, and the anti-counterfeiting code stored will be issued after the RFID device is altered. The consumer does not need to open the packaging of the goods, but can directly check the authenticity of the goods by reading the tracking code using a RFID reading device of a mobile phone or desktop computer. If the goods is genuine, the query result includes information such as the store where the goods was bought and when the goods was bought, etc. No matter in which way the anti-counterfeiting code is stored, particularly in the case that the anti-counterfeiting code is stored in a LF RFID device, since it is possible that data leakage occurs before sales or someone uses the anti-counterfeiting code to check the authenticity, the server 10 of the electronic anti-counterfeiting system 100, after searching the database 11, will feed back to a telephone voice system for queries or a query program such information that the goods corresponding to the anti-counterfeiting code has not yet been for sale, so no other information will be provided.

In one example of the present invention, the electronic anti-counterfeiting system 100 further comprises at least one logistics code and anti-counterfeiting code generator 40, and at least one recording terminal 50; the electronic anti-counterfeiting method further comprises: an associating step, wherein a pair of the logistics code and the anti-counterfeiting code, which are associated with each other, are generated by the logistics code and anti-counterfeiting code generator 40 for the goods after the manufacturer of the goods produces the goods; and a recording step, wherein the manufacturer, transportation provider or distributor of the goods scans or reads the logistics code and the data information of the goods through the recording terminal 50, and uploads the data information to the server 10.

In the above-mentioned example, a pair of the logistics code and the anti-counterfeiting code, which are associated with each other, are generated by the logistics code and anti-counterfeiting code generator 40 for the goods. Goods production information in the database 11 records the information about the production of the goods, including the production plant, the batch number, the date of manufacture and the check batch number, etc. The above information will not be updated after the goods leaves the factory. Goods production information in the database 11 records the information after the goods leaves the factory, including arriving at or leaving a logistics hub, arriving at or leaving a retailer's warehouse, etc. Sales information in the database 11 records the information about wholesale and/or retail, further including warranty information. Authenticity check information in the database 11 records every query made by a consumer by himself/herself. The database 11 can retrieve the information of the same goods using the logistics code or anti-counterfeiting code; however, except the manufacturer, none of the logistics companies, retailers and consumers can associate the logistics code with the anti-counterfeiting code using the database 11 of the server 10. The data information includes: production data information, including the manufacturer of the goods, the production plant, the production batch number, the date of manufacture and the check batch number; logistics information, including the information showing that the goods, after leaving the factory, arrives at or leaves a logistics hub, arrives at or leaves the warehouse of a retailer, and arrives at or leaves the Customs and the Inspection Bureau, as well as the information about freight vehicles, cargo planes and ships; and sales information, including the information about the wholesale and/or retail of the goods for sale, and/or the information about the repair and change/return of the goods.

In one example of the present invention, the recording terminal 50 comprises a second RF readout unit 51 and/or a second camera lens 511 and/or a second Bluetooth readout unit 53 and a second sending device 512; the querying step further comprises: the second RF readout unit 51 and/or the second camera lens 511 and/or the second Bluetooth readout unit 53 reading the logistics code and logistics information associated with the goods; and the second sending device 512 sending the logistics information to the server 10.

The sales terminal 20 further comprises: a third RF readout unit 22 and/or a third camera lens 21 and/or a third keyboard and/or a third Bluetooth readout unit 23; the querying step further comprises: the third RF readout unit 22 and/or the third camera lens 21 and/or the third Bluetooth readout unit 23 reading the logistics code; or the third keyboard for entering the logistics code; and the third sending device 36 sending the logistics code to the server 10 and providing the sales information of the goods.

In this embodiment, both the sales terminal 20 and the recording terminal 50 can be Bluetooth devices, which read the logistics code and send it to the server 10 to query about the corresponding logistics information. In addition, the third RF readout unit 22 can use the password provided by the server 10 to send a command to the HF or UHF read-write RFID tag of the anti-counterfeiting code device to activate the anti-counterfeiting code device.

In one example of the present invention, the query terminal 30 is a mobile phone, fixed-line phone or desktop computer; the covering is a fragile sticker or swipe card; the server 10 further comprises: an automatic voice query module 12, which receives the anti-counterfeiting code sent by the mobile phone, fixed-line phone or desktop computer and broadcasts the query result information by voice; and a webpage query module 13, which provides a webpage query interface, the webpage query module 13 receiving the anti-counterfeiting code sent by the mobile phone, fixed-line phone or desktop computer and displaying the query result information on the webpage query interface.

In one embodiment of this example, after the purchase of goods, the consumer checks the authenticity of the goods. The anti-counterfeiting code is printed, so it can only be exposed and displayed in an irreversible destructive way. In the case that the consumer finds that the anti-counterfeiting code is intact, the consumer opens the covering above the anti-counterfeiting code by himself/herself; if the authenticity check result is that it is not the first query, for example, it is already the third query, the consumer will know that the goods is counterfeit or the anti-counterfeiting system has been broken.

In one embodiment of the present invention, the electronic anti-counterfeiting system 100 comprises: a server 10; one or more goods for sale, each said goods for sale being linked with a unique logistics code and a unique anti-counterfeiting code; one or more sales terminals 20; one or more recording terminals 50; and one or more query terminals 30, the query terminal 30 comprising a mobile phone or a fixed-line telephone. The server 10 comprises one or more storage devices, for storing the programs of the server 10 and for use as a database 11. The server 10 is located in a single server center or is located in a plurality of data centers in the form of cloud processing. The database 11 of the anti-counterfeiting system stores the information of a single product or multiple products, including the production data information, logistics information, sales information, and authenticity check information of every piece of goods. And, the data of every piece of goods can be retrieved and updated using a logistics code or tracking code.

In one example of the present invention, it is unnecessary to keep a logistics code confidential, any employee dealing with logistic matters can gain access to the logistics code since the goods leaves the factory, and every employee in the logistics company can read the logistics code so that he/she can update it in the system. On this principle, the logistics code can stored and issued in the form of a text, barcode, QR code, RFID, or even Bluetooth iBeacon. In different embodiments, in consideration of costs, a printed logistics code (to be read using a scanner) is preferably chosen (in consideration of production), or radio transmission, including RFID or Bluetooth, can be used in order to increase the operating efficiency. That is to say, anyone can read the logistics code while causing no damage to the security of the present invention.

Since centralized transportation of goods is adopted during transport, e.g., a box, a board, a truck, a container or containers of goods are shipped together, so the updating of logistics codes may have another function, that is, one-off updating of a large number of logistics codes. For example, logistics codes can be printed on shipping lists in the form of reports for the one-off updating of a plurality of logistic codes.

Further, in the same embodiment, logistics codes may appear in various shapes, for example, for goods at a high price, the logistics codes may be HF RFID labels (to facilitate quick reading at a long distance), barcodes (to make it convenient for a cheap barcode machine to read the logistics codes), or QR codes on a shipping list, respectively, so that the logistics codes are updated in batches. In this case, the logistics codes are stored in both RFID labels and barcodes, with a view to making it convenient to use different recording terminals 50 so as to achieve the function of tracking goods.

The basic information of an anti-counterfeiting code is that the anti-counterfeiting code is confidential, and only after the process of purchasing goods has been completed and the consumer opens the shield in a destructive way, can the anti-counterfeiting code be read. One of the objects is that the anti-counterfeiting code is unconvertible, in order to prevent the legal copy anti-counterfeiting code device produced by the legal copy production plant from being transferred to counterfeit goods. The easiest way is to use a printed anti-counterfeiting code covered with a fragile sticker (eggshell paper), i.e., once a purchaser intends to buy goods with an exposed anti-counterfeiting code, he/she needs consider whether the goods should be bought or returned.

In one example of the present invention, the electronic anti-counterfeiting system 100 uses a printed anti-counterfeiting code, and the electronic anti-counterfeiting method comprises:

When goods have been produced and are being packaged, the manufacturer assigns a logistics code and an anti-counterfeiting code to every piece of goods, removably mounts a printed matter bearing the anti-counterfeiting code on the inner packing of the goods, and sticks a printed matter bearing the logistics code to the outer layer of the goods.

Information of goods is established, and the production plant, the batch number, the date of manufacture and the check batch number, etc., are recorded in the goods database 11 inside the anti-counterfeiting system; the same information can be retrieved using the logistics code or anti-counterfeiting code.

According to the sales or logistics arrangements of the manufacturer, a single or a plurality of goods are sent out from the factory in the same batch, and the relevant logistics codes are recorded on the delivery order or shipping bill or air waybill or shipping list, and are sent out in the manner of report or data exchange.

One or more goods are sent to the final point of sale through logistics processes through the point of sale, the processes of the goods are recorded in each transfer point or warehouse, and a single or a plurality of logistics codes are transferred to the server 10 of the anti-counterfeiting system to update the goods database 11. The updated information includes the record that the goods arrive at or leave a logistics hub or warehouse. The goods finally arrives at the retail store.

When the goods is for sale, the anti-counterfeiting system receives the logistics code from the sales terminal 20 in the retail store upon confirmation of the sale, and records that the goods is sold in the store.

After the purchase of the goods, the consumer opens the packaging of the goods, and must expose the covered tracking code in an irreversible way.

The consumer reads the logistics code using the camera lens of a mobile phone and makes a query on the server 10 of the anti-counterfeiting system; the query result is displayed on the display screen of the mobile phone. Alternatively, the consumer can use a fixed-line telephone to make a voice query on the server 10 of the anti-counterfeiting system. Alternatively, the consumer can network the browser of a desktop computer with the server 10 of the anti-counterfeiting system to make a query.

In one example of the present invention, the electronic anti-counterfeiting system 100 stores the anti-counterfeiting code in a LF (120-150 kHz) read-only RFID mode, and the electronic anti-counterfeiting method comprises: When goods have been produced and are being packaged, the manufacturer assigns a logistics code and an anti-counterfeiting code to every piece of goods, removably mounts the RFID tag of the anti-counterfeiting code on the inner packing of the goods, and sticks a printed matter bearing the logistics code to the outer layer of the goods. The anti-counterfeiting code is the unique identification code of a RFID device.

Information of goods is established, and the production plant, the batch number, the date of manufacture and the check batch number, etc., are recorded in the goods database 11 inside the anti-counterfeiting system; the same information can be retrieved using the logistics code or anti-counterfeiting code.

According to the sales or logistics arrangements of the manufacturer, a single or a plurality of goods are sent out from the factory in the same batch, and the relevant logistics codes are recorded on the delivery order or shipping bill or air waybill or shipping list, and are sent out in the manner of report or data exchange.

One or more goods are sent to the final point of sale through logistics processes through the point of sale, the processes of the goods are recorded in each transfer point or warehouse, and a single or a plurality of logistics codes are transferred to the server 10 of the anti-counterfeiting system to update the goods database 11. The updated information includes the record that the goods arrive at or leave a logistics hub or warehouse. The goods finally arrive at the retail store.

When the goods is for sale, the anti-counterfeiting system receives the logistics code from the sales terminal 20 in the retail store upon confirmation of the sale, and records that the goods is sold in the store.

The consumer reads the tracking code using the reader of a RFID device of a mobile phone and makes a query on the server 10 of the electronic anti-counterfeiting system; the query result is displayed on the display screen of the mobile phone. Alternatively, the consumer can read the anti-counterfeiting code using the reader of a RFID device of a desktop computer, and network the browser of the desktop computer with the server 10 to make a query.

In one example of the present invention, the electronic anti-counterfeiting system 100 stores the anti-counterfeiting code in a HF (13.56 MHz) read-write RFID mode, and the electronic anti-counterfeiting method comprises: when goods have been produced and are being packaged, the manufacturer assigns a logistics code and an anti-counterfeiting code to every piece of goods, removably mounts the RFID tag of a tracking code on the inner packing of the goods, and sticks a printed matter bearing the logistics code to the outer layer of the goods.

When the goods leaves the factory, the RFID tag of the tracking code is set to be read-only, a password is required to alter information, and the tracking code is stored in the memory of a RF identifier and will not be sent out.

Information of goods is established, and the production plant, the batch number, the date of manufacture and the check batch number, etc., are recorded in the goods database 11 inside the anti-counterfeiting system; the same information can be retrieved using the logistics code or anti-counterfeiting code.

According to the sales or logistics arrangements of the manufacturer, a single or a plurality of goods are sent out from the factory in the same batch, and the relevant logistics codes are recorded on the delivery order or shipping bill or air waybill or shipping list, and are sent out in the manner of report or data exchange.

One or more goods are sent to the final point of sale through logistics processes through the point of sale, the processes of the goods are recorded in each transfer point or warehouse, and a single or a plurality of logistics codes are transferred to the server 10 of the electronic anti-counterfeiting system 100 to update the goods database 11. The updated information includes the record that the goods arrive at or leave a logistics hub or warehouse. The goods finally arrive at the retail store.

When the goods is for sale, the electronic anti-counterfeiting system 100 receives the logistics code from the sales terminal 20 in the retail store upon confirmation of the sale, and records that the goods is sold in the store. The sales terminal 20 in the retail store further uses the password to alter the RFID device such that it can send out the anti-counterfeiting code.

The consumer reads the tracking code using the reader of a RFID device of a mobile phone and makes a query on the server 10 of the electronic anti-counterfeiting system; the query result is displayed on the display screen of the mobile phone. Alternatively, the consumer can read the anti-counterfeiting code using the reader of a RFID device of a desktop computer, and network the browser of the desktop computer with the server 10 to make a query.

In one embodiment of the present invention, the anti-counterfeiting code is stored in a LF read-only RFID device. After the purchase of goods, the consumer does not need to open the packaging of the goods, but can directly check the authenticity of the goods by reading the tracking code using a RFID reading device of a mobile phone or desktop computer. If the goods is genuine, the query result includes information such as the store where the goods was bought and when the goods was bought, etc.

For example, a consumer bought famous liquor from a store in Beijing, brought the liquor to Zhaoqing in Guangdong, sent it to a friend, and told the friend that the liquor was bought from a store on Wangfujing Street of Beijing on the 16$^{th}$ day of February in some year, and the recipient could make a query directly at the server 10 of an anti-counterfeiting system though the recipient did not have an invoice. The person making the enquiry decides by himself/herself if he/she believes the goods is genuine, for example, if the date of sale is consistent with the date the consumer told him/her. In another embodiment, the consumer bought goods not by himself/herself; if the result he/she gets after checking the authenticity using the anti-counterfeiting code is the first query, and he/she knows the sales information of the goods, he/she can decide that the goods is genuine.

Further, in the above-mentioned examples, the product manufacturer can decide whether the logistics process of the goods after it leaves the factory is further provided in addition to the information about the point of sale, when a consumer checks the authenticity of the goods. Preferably, when the consumer checks the authenticity of goods, only the date of sale and the date of manufacture are provided. In another embodiment, when the consumer checks the authenticity of goods, the warranty period of the goods is further provided, e.g., the manufacturer offers an one-year warranty period, and the authenticity check system provides the date of manufacture, the sale period and the warranty period of the goods. In a further embodiment, when the consumer checks the authenticity of goods, the main logistics process of the goods is further provided. The product manufacturer can completely track the logistics process of the goods from the factory to the consumer, according to the process updated by the logistics code and the consumer's behavior of checking the authenticity of the goods using the anti-counterfeiting code once or many times. In a preferred embodiment, the electronic anti-counterfeiting system 100 provided by the present invention can record the relevant information on the terminal where the consumer makes the query, including the location, the model of the mobile phone, and the browser of the desktop computer, etc.; further, if the consumer is willing to provide information, the anti-counterfeiting system can additionally offer a customer relationship management (CRM) function for merchandise sales and strategic analysis.

To sum up, according to the present invention, an electronic anti-counterfeiting system is configured to comprise: a server disposed in a data center, the server comprising a database which stores the information about the logistics code and the anti-counterfeiting code of goods and the goods' production, transportation, sales and authenticity information corresponding to the information about the logistics code and the anti-counterfeiting code; after reading the logistics code of the goods, the sales terminal sends to the server such information that the goods is sold and/or sends to the query terminal the anti-counterfeiting code of the goods; and after reading the anti-counterfeiting code of the goods, the query terminal sends the anti-counterfeiting code to the server to gain access to query result information returned from the server. A unique logistics code of the goods is provided on the packaging of the goods; a unique anti-counterfeiting code of the goods is provided on the goods and/or within the packaging of the goods; thus, the genuineness of the goods and the related commodity information can be queried by the anti-counterfeiting code of the goods, thereby improving the reliability of querying the genuineness of goods using the anti-counterfeiting code. In addition, the logistics code can be utilized to record the entire distribution process of the goods from production to consumers. Further, the anti-counterfeiting code is kept confidential before the sale of goods by covering the printed anti-counterfeiting code with a covering, or by packaging a RFID tag with a RF shielding device to prevent radio-frequency leakage, or closing a Bluetooth transmitting device by power separation, etc. Therefore, the present invention not only makes it sure that the genuineness of the goods can be queried, but also provides more information for consumers, and particularly provides consumers with the corresponding information that can be provided, for their reference, when the same goods is queried more than once, thereby solving the counterfeiting problem caused by the lax confidentiality and leakage of electronic counterfeiting codes in the prior art.

Of course, the present invention may have a variety of other embodiments. Those skilled in the art can make all kinds of corresponding changes and modifications according to the present invention without departing from the spirit and essence of the present invention. It is intended that all these changes and modifications be covered by the appended claims of the present invention.

The invention claimed is:

1. An electronic anti-counterfeiting tagging system for tagging onto goods, comprising
    a unique logistics code which is set in a logistics code device;
    a unique anti-counterfeiting code which is set in an anti-counterfeiting code device;
    the logistics code device provided on the goods in a manner which is accessible physically to a handler;
    the anti-counterfeiting code device provided on the goods in a manner which is not accessible physically to a handler;
    wherein
    the unique anti-counterfeiting code is usable for authenticating the goods;
    the logistics code is useable for recording the distribution process of the goods;
    the anti-counterfeiting, code device inactivate, the anti-counterfeiting code device being activated by one of a password entered or removal of a non-conductive fragile paper from the anti-counterfeiting code device after confirmation of sale.

2. An electronic anti-counterfeiting tagging system for tagging onto goods, as claimed in claim 1, wherein:
    the logistics code device is disposed on the packaging of the goods, and the anti-counterfeiting code device is disposed within the packaging of the goods and/or on the goods.

3. An electronic anti-counterfeiting tagging system for tagging onto goods, as claimed in claim 1, wherein:
    the anti-counterfeiting code device is a printed text, barcode and/or QR code,
    a RFID tag, a Bluetooth transmitting device.

4. An electronic anti-counterfeiting tagging system for tagging onto goods, as claimed in claim 1, wherein:
    the anti-counterfeiting code device is removably disposed on the goods or the packaging of the goods, and the anti-counterfeiting code device is configured to be damaged when it is removed.

5. An electronic anti-counterfeiting egging system for tagging onto goods, as claimed in claim 4, wherein:
    the anti-counterfeiting code device further comprises a covering which covers over the anti-counterfeiting code, and the covering will be damaged or broken is an attempt is made to remove or open it.

6. An electronic anti-counterfeiting tagging system for tagging onto goods, as claimed in claim 1, wherein:
    the anti-counterfeiting code device is a Bluetooth transmitting device; the Bluetooth transmitting device comprises;
    a button battery, disposed at the pedestal of the Bluetooth transmitting device;
    the non-conductive fragile paper, connected with a brace and covering a positive electrode of the button battery; and
    a conductive stripe, disposed at the upper end of the non-conductive fragile paper and connected to a negative electrode of the button battery via a conductive, mobile fixed member,
    wherein, after the non-conductive fragile paper is torn by the brace, the conductive stripe is in communication with the positive electrode of the button battery, the Bluetooth transmitting device emits a Bluetooth code in an effective communication range, and the Bluetooth transmitting device the Bluetooth transmitting device emits the anti-counterfeiting code.

7. An electronic anti-counterfeit ng system for checking the authenticity of goods, characterized in that
    the goods has a unique logistics code which is set in one or more logistics code devices and a unique anti-counterfeiting code which is set in an anti-counterfeiting code device and the electronic anti-counterfeiting system comprises:
    a server comprising a database which stores the information about the logistics code and the anti-counterfeiting code of goods and the goods' production, transportation, sales and authenticity information corresponding to the information about the logistics code and the anti-counterfeiting code;
    at least one sales terminal in communication with the server, the sales terminal, after reading the logistics code of the goods, sending to the server such information that the goods is sold; and
    at least one query terminal in communication with the server, the query terminal, after reading the anti-counterfeiting code of the goods, sending the anti-counterfeiting code to the server to gain access to query result information returned from the server;
    wherein the anti-counterfeiting code device inactivate, the anti-counterfeiting code device being activated by one of a password entered or removal of a non-conductive fragile paper from the anti-counterfeiting code device after confirmation of sale.

8. The electronic anti-counterfeiting system according to claim 7, characterized in that
    the logistics code device is disposed on the packaging of the goods, and the anti-counterfeiting code device is disposed within the packaging of the goods and/or on the goods.

9. The electronic anti-counterfeiting system according to claim 7, characterized in that
    the logistics code device comprises: a printed text, barcode and/or QR code as the logistics code; or
    the logistics code device comprises a radio frequency identification (RFID) tag, which stores the logistics code; or
    the logistics code device comprises a Bluetooth transmitting device, which stores the logistics code; and
    the logistics code is stored in one more of the logistics code devices.

10. The electronic anti-counterfeiting system according to claim 7, characterized in that
    the anti-counterfeiting code device comprises: a printed text, barcode and/or QR code as the anti-counterfeiting code; or
    the anti-counterfeiting code device comprises a RFID tag, which stores the anti-counterfeiting code; or
    the anti-counterfeiting code device comprises a Bluetooth transmitting device, which stores the anti-counterfeiting code;

the anti-counterfeiting code device is removably disposed on the goods or the packaging of the goods, and the anti-counterfeiting code device is damaged when it is removed; and the anti-counterfeiting code is confidential before the process of the sale of the goods is completed.

11. The electronic anti-counterfeiting system according to claim 10, characterized in that when the anti-counterfeiting code is a printed text, barcode and/or QR code, it is printed on the anti-counterfeiting code device; and the anti-counterfeiting code device further comprises a covering which covers over the anti-counterfeiting code, and the covering will be damaged or broken is an attempt is made to remove or open it.

12. The electronic anti-counterfeiting system according to claim 10, characterized in that the anti-counterfeiting code device is a low-frequency (LF) read-only RFID tag, the anti-counterfeiting code device comprises an operable radio frequency (RF) shielding device, the LF read-only RFID tag is disposed within the RF shielding device, and, when the RFID tag is disposed within a RE shield packaging, the signal emitted by the RFID tag is shielded by the RF shield packaging; and the RF shield packaging is damaged immediately it is opened, and it cannot be repackaged.

13. The electronic anti-counterfeiting system according to claim 12, characterized in that the RFID tag has a frequency of use of 120 to 150 kHz.

14. The electronic anti-counterfeiting system according to claim 10, characterized in that the anti-counterfeiting code device is a high-frequency (HF or ultra-high-frequency (UHF) read-write RFID tag, and the anti-counterfeiting code is stored in the HF or UHF read-write RFID tag; and the HF or UHF read-write RFID tag is activated and issues the anti-counterfeiting code after a default password is entered.

15. The electronic anti-counterfeiting system according to claim 14, characterized in that the HF read-write RFID tag has a frequency of use of 13.56 MHz; or he UHF read-write RFID tag has a frequency of use of 915 MHz.

16. The electronic anti-counterfeiting system according to claim 10, characterized in that the anti-counterfeiting code device is a Bluetooth transmitting device; the Bluetooth transmitting device comprises:

a button battery, disposed at the pedestal of the Bluetooth transmitting device;

non-conductive fragile paper, connected with a brace and covering the positive electrode of the button battery; and a conductive stripe, disposed at the upper end of the non-conductive fragile paper and connected to the negative electrode of the button battery via a conductive, mobile fixed member, wherein, after the non-conductive fragile paper is torn by the brace, the conductive stripe is in communication with the positive electrode of the button battery, the Bluetooth transmitting device emits a Bluetooth code in an effective communication range, and the Bluetooth transmitting device the Bluetooth transmitting device emits the anti-counterfeiting code.

17. The electronic anti-counterfeiting system according to claim 7, characterized in that the electronic anti-counterfeiting system further comprises:

at least one logistics code and anti-counterfeiting code generator, adapted for generating a pair of the logistics code and the anti-counterfeiting code, which are associated with each other, for the goods after he manufacturer of the goods produces the goods; and at least one recording terminal, adapted for enabling the manufacturer, transportation provider or distributor of the goods to scan or read the logistics code and the data information of the goods, and to upload the data information to the server.

18. The electronic anti-counterfeiting system according to claim 17, characterized in that the data information includes:

production data information, including the manufacturer of the goods, the production plant, the production batch number, the date of manufacture and the check batch number;

logistics information, including the information showing that the goods, after leaving the factory, arrives at or leaves a logistics hub, arrives at or leaves the warehouse of a retailer, and arrives at or leaves the Customs and the Inspection Bureau, as well as the information about freight vehicles, cargo planes and ships; and sales information, including the information about the wholesale and/or retail of the goods for sale, and/or the information about the repair and change/return of the goods.

19. The electronic anti-counterfeiting system according to claim 17, characterized in that the recording terminal comprises:

a second RF readout unit and/or a second camera lens and/or a second Bluetooth readout unit, adapted for reading the logistics code and logistics information associated with the goods; and a second sending device, which sends the logistics information to the server.

20. The electronic anti-counterfeiting system according to claim 7, characterized in that the query terminal comprises:

a first RF readout unit and/or a first camera lens and/or a first Bluetooth readout unit, adapted for reading the anti-counterfeiting code; or, a first keyboard, adapted for entering the anti-counterfeiting code;

a first sending device, adapted for sending the anti-counterfeiting code to the server; and a first display and/or a first amplifier, adapted for displaying and/or issuing query result information returned from the server.

21. The electronic anti-counterfeiting system according to claim 20, characterized in that the query result information includes:

the anti-counterfeiting code is incorrect, and there is no information related to the goods; the anti-counterfeiting code may be an error code, and the goods may be a counterfeit;

the anti-counterfeiting code is correct, but the goods is not for sale, the anti-counterfeiting code may be an error code, and the goods may be a counterfeit or stolen goods;

the anti-counterfeiting code is correct, and the number of times the anti-counterfeiting code is queried and the selling time are provided;

the anti-counterfeiting code is correct, and the data information of the goods is displayed; and/or whether there are abnormal queries of the anti-counterfeiting code, and the abnormal queries include queries before sale and multiple queries.

22. The electronic anti-counterfeiting system according to claim 20, characterized in that the query terminal is a mobile phone, fixed-line phone or desktop computer; the covering is a fragile sticker or swipe card;

the server further comprises:

an automatic voice query module, which receives the anti-counterfeiting code sent by the mobile phone, fixed-line phone or desktop computer and broadcasts the query result information by voice; and a webpage query module, which provides a webpage query interface, the webpage query module receiving the anti-counterfeiting code sent by the mobile phone, fixed-line phone or desktop computer and displaying the query result information on the webpage query interface.

23. The electronic anti-counterfeiting system according to claim 7, characterized in that the sales terminal comprises:

a third RF readout unit and/or a third camera lens and/or a third keyboard and/or a third Bluetooth readout unit, adapted for reading the logistics code; or a third keyboard, adapted for entering the logistics code; and a third sending device, adapted for sending the logistics code to the server and providing the sales information of the goods.

24. The electronic anti-counterfeiting system according to claim 23, characterized in that the third RF readout unit of the sales terminal uses the password provided by the server to send a command to the HF or UHF read-write RFID tag of the anti-counterfeiting code device to activate the anti-counterfeiting code device.

* * * * *